(12) United States Patent
Trainin et al.

(10) Patent No.: US 8,976,768 B2
(45) Date of Patent: Mar. 10, 2015

(54) PEER SETUP OF PREDEFINED MODULATION TRANSMISSION

(71) Applicant: Intel Corporation, Santa Clara, CA (US)

(72) Inventors: Solomon Trainin, Haifa (IL); Menashe Sofer, Katzir (IL)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 13/628,547

(22) Filed: Sep. 27, 2012

(65) Prior Publication Data

US 2014/0086096 A1    Mar. 27, 2014

(51) Int. Cl.
*H04W 4/00* (2009.01)

(52) U.S. Cl.
USPC .......................................................... 370/338

(58) Field of Classification Search
CPC ..................................................... H04L 45/026
USPC .......................................................... 370/338
See application file for complete search history.

(56) References Cited

U.S. PATENT DOCUMENTS

| 2007/0115853 | A1* | 5/2007 | Wentink ........................ 370/252 |
| 2008/0219207 | A1 | 9/2008 | Chen et al. |
| 2009/0296674 | A1* | 12/2009 | Ekl et al. ........................ 370/338 |
| 2010/0080266 | A1* | 4/2010 | Zhang et al. ................... 375/140 |
| 2010/0202317 | A1 | 8/2010 | Proctor, Jr. |

FOREIGN PATENT DOCUMENTS

| KR | 10-2006-0028314 A | 3/2006 |
| WO | 99/63682 A2 | 12/1999 |
| WO | 2014/051784 A1 | 4/2014 |

* cited by examiner

*Primary Examiner* — Brandon Renner
(74) *Attorney, Agent, or Firm* — Forefront IP Lawgroup, PLLC

(57) ABSTRACT

Described herein are systems and techniques related to maintaining wireless connections between stations (STAs). A message is communicated between the STAs to anticipate modulation type that may be used in transmitting a packet under the Wireless Gigabit alliance (WiGig) specification and the Institute of Electrical and Electronics Engineers (IEEE) 802.11ad standard. The message may be used in disabling or enabling automatic gain control (AGC) at a receiving STA end.

24 Claims, 7 Drawing Sheets

| Heartbeat 302 | Heartbeat elapsed indication 304 |

PEER SETUP OF PREDEFINED MODULATION TRANSMISSION

BACKGROUND

The Wireless Gigabit Alliance (also known as WiGig) specification may allow wireless devices to communicate at multi-gigabit speeds. Multi-gigabit speeds may enable high performance wireless data, display and audio applications that supplement capabilities of current wireless local area network (LAN) devices. For example, WiGig tri-band enabled devices, which operate in 60 GHz bands, may deliver data transfer rates up to 7 Gbits/sec.

Currently, there are three different modulation types in the WiGig specification and the Institute of Electrical and Electronics Engineers (IEEE) 802.11ad standard. The different modulation types may include a control physical level (PHY) modulation, a single carrier (SC) modulation, or orthogonal frequency division multiplexing (OFDM) modulation. Due to difference in preamble durations between these modulation types, linearity in a receiving station (STA) device may be affected when a wireless connection is to be maintained between previously connected STA devices. In other words, the receiving STA may need to anticipate which modulation type is to be utilized in a received transmitted power to maintain the linearity in the receiving STA device.

Figure 1:
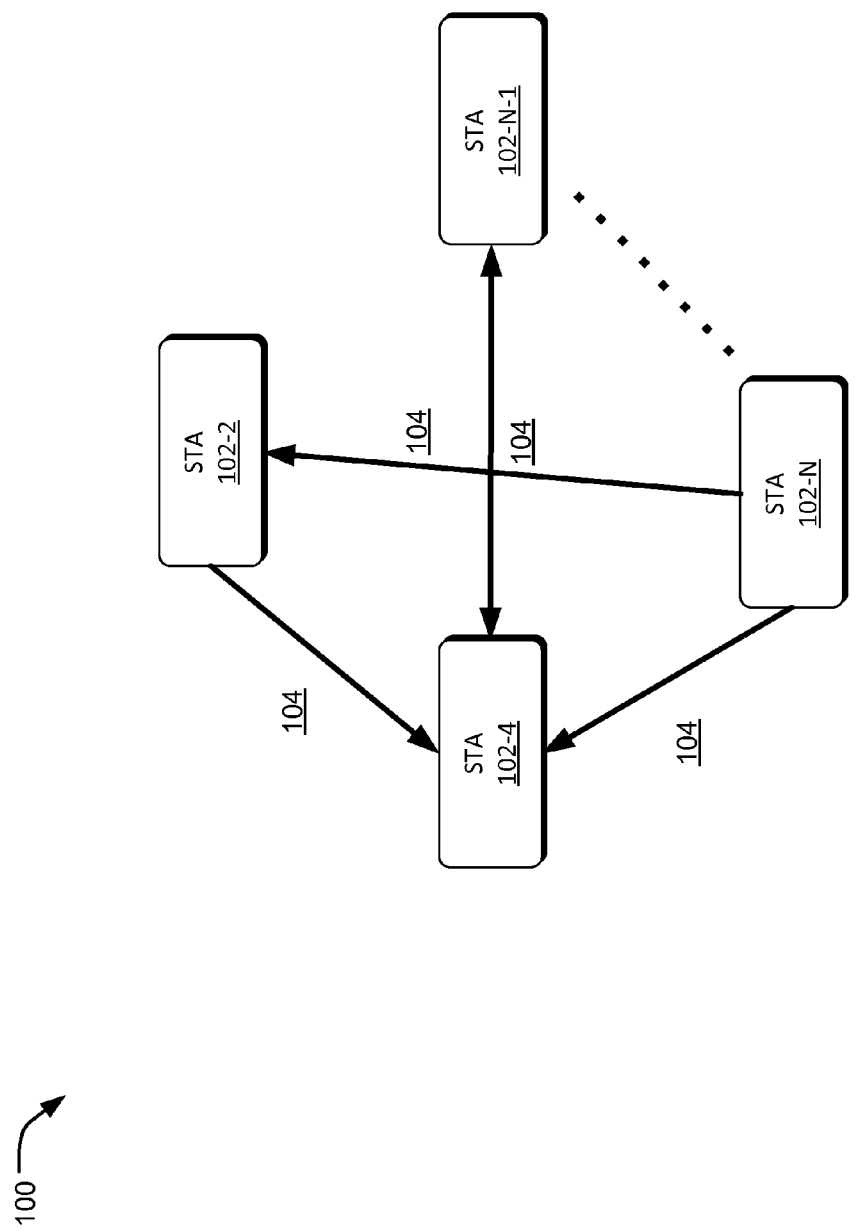
FIG. 1 illustrates an example system that adapts the wireless gigabit alliance (WiGig) specification and the Institute of Electrical and Electronics Engineers (IEEE) 802.11 ad standard.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for maintaining wireless connection between stations (STAs) in the wireless gigabit alliance (WiGig) specification and the Institute of Electrical and Electronics Engineers (IEEE) 802.11ad standard. In an implementation, a wireless connection may be established between a first STA and a second STA operating at a 60 GHz frequency band. In this implementation, a message is communicated between the first and second STAs with regard to a particular type of modulation that is to be used in transmitting a packet within a transmission opportunity (TxOP). For example, the first STA may transmit the packet using the particular type of modulation to the second STA, or vice-versa, to keep or maintain the wireless connection. In this example, the message may include information as to the particular type of modulation to be used.

Under the WiGig specification or IEEE 802.11ad standard, the modulation type may include a control physical level (PHY) modulation, single carrier (SC) modulation, or orthogonal frequency division multiplexing (OFDM) modulation. Due to difference in preamble lengths between these modulation types, the message may be configured and communicated from a receiving STA end to a transmitting STA end. For example, the second STA may use the message to obtain a pre-established agreement between the STAs or peers to signify which type of modulation is to be utilized for the transmitted packet.

In an implementation, the anticipation of the type of modulation to utilize may allow the (receiving) STA to enable its automatic control gain (AGC) feature to maintain linearity in received transmitted power. For example, if the control PHY modulation is utilized, then the STA may enable its AGC feature. In this example, the STA may disable its AGC feature and keep a former gain when the SC modulation or the OFDM modulation is utilized in the transmitted packet.

In an implementation, the communicated message may include a heartbeat value and a heartbeat elapsed indication value that are checked by a transmitting STA at start of TxOP. In this implementation, the heartbeat elapsed indication value may be used to derive a heartbeat elapsed time value that may be further compared against an elapsed time in determining which type of modulation to utilize. For example, if the derived heartbeat elapsed time is less than the elapsed time, then a transmitting STA may transmit a packet such as, a request to send (RTS) or self-clear to send (CTS) packet using the control PHY modulation. Otherwise, if the heartbeat elapsed time is longer than the elapsed time, then the transmitting STA may transmit the packet using any type of modulation at the start of the TxOP. In an implementation, the elapsed time and the heartbeat elapsed time may be computed using the following formulas:

$$\text{Elapsed Time} = (\text{starting time for a next TxOP}_n) - (\text{end of maximum duration time for previous TxOP}_{n-1})$$

$$\text{Heartbeat Elapsed Time} = (2^{Heartbeat\ Elapsed\ Indication}) * (0.25\ \text{msec})$$

where the $\text{TxOP}_n$ is the current TxOP while $\text{TxOP}_{n-1}$ is the previous TxOP; and the Heartbeat Elapsed Indication is a value defined by a receiving station and communicated to the peer station such as the transmitting STA above.

FIG. 1 illustrates an exemplary system 100 that uses or adapts the WiGig specification or IEEE 802.11ad standard. In an implementation, the system 100 may include STAs 102-2, 102-4, . . . 102-N that may establish wireless connections 104 with one another. In this implementation, the system 100 may implement maintaining of the wireless connections between STAs 102-2, 102-4, . . . 102-N by utilizing a message (not shown) that may include a predefined agreement between the STAs 102. For example, the message (not shown) may be configured and initiated at a receiving STA end (e.g., STA 102-2) and communicated to another transmitting STA or STAs (e.g., STA 102-4, or STA 102-6, etc.).

In an implementation, the message (not shown) may include a particular type of modulation to use when transmitting a packet (not shown) through the wireless connection 104. For example, the message may include when to use the control PHY modulation as defined in the WiGig specification or IEEE 802.11ad standard. In this example, other types of modulations, such as SC modulation or OFDM modulation may be used to keep or maintain the wireless connection based upon configuration of the message (not shown).

In an implementation, the STAs 102 may include an access point (AP), personal basic service set control point (PCP), non-AP STA, non-PCP STA, a portable devices such as ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

Figure 2:
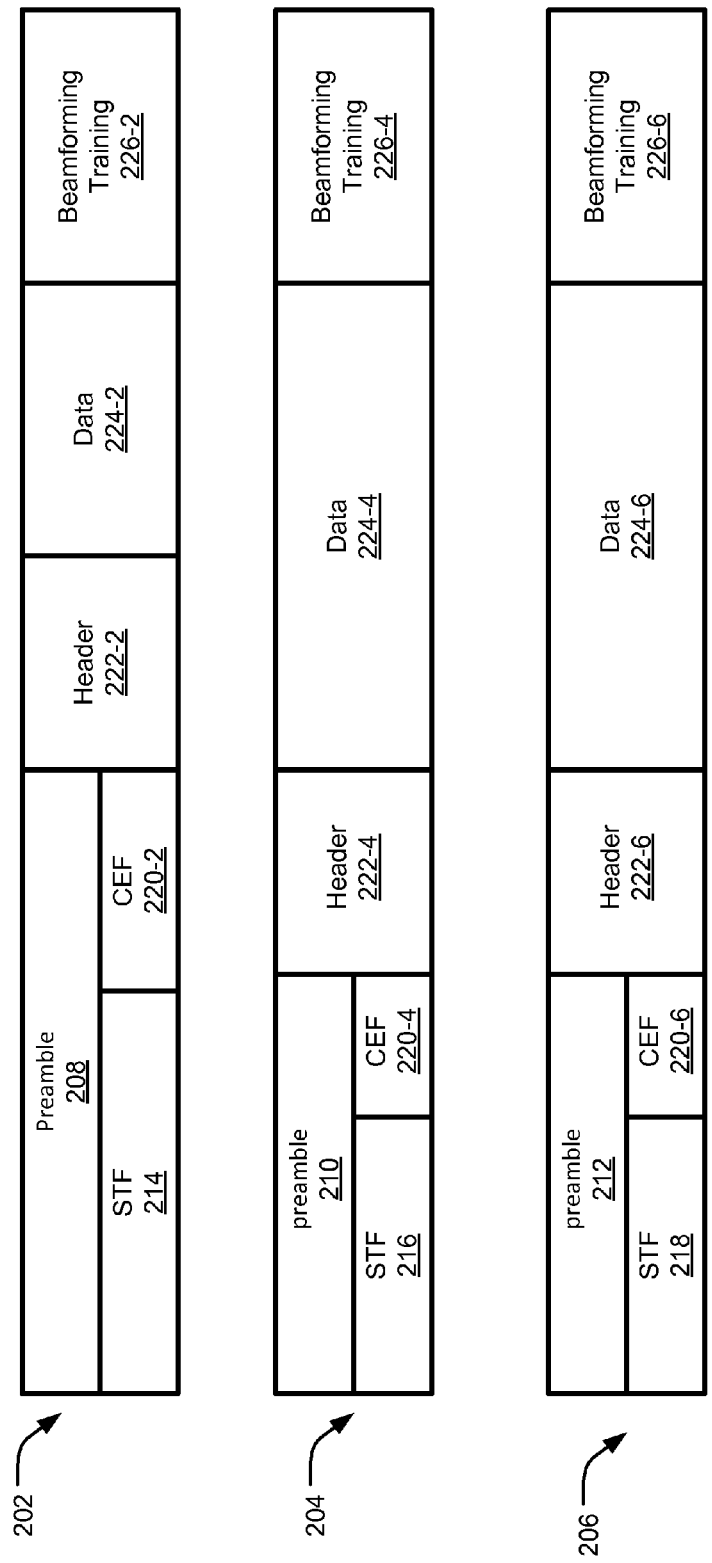
FIG. 2 illustrates example packet structures for different modulation types in the wireless gigabit alliance (WiGig) specification and the Institute of Electrical and Electronics Engineers (IEEE) 802.11ad standard.

FIG. 2 shows an example packet structures for different modulation types in the IEEE 802.11ad standard or WiGig specification. In an implementation, the modulation types may include a control PHY modulation 202, a SC modulation 204 and OFDM modulation 206. In this implementation, the control PHY modulation 202 may include a preamble 208 that is substantially longer than preambles 210 and 212 of the SC modulation 204 and OFDM modulation 206, respectively. For example, the preamble 208 may include a short training field (STF) 214 of 6400 $T_c$ as compared to STF 216 (2176 $T_c$) and STF 218 (2176 $T_c$) of the preambles 210 and 212, respectively.

In an implementation, the channel estimation field (CEF) 220 for the three types of modulations have the same duration or value i.e., 1152 $T_c$. In other words, while the three types of modulations have the same value of CEF 220, the difference in the amount of their respective STF may provide the control PHY modulation 202 with the longer preamble 208. In an implementation, a header 222, data 224, and beamforming training 226 may include standard packet formats/structures for transmission of the data 224 in the WiGig specification or IEEE 802.11ad standard.

Figure 3:
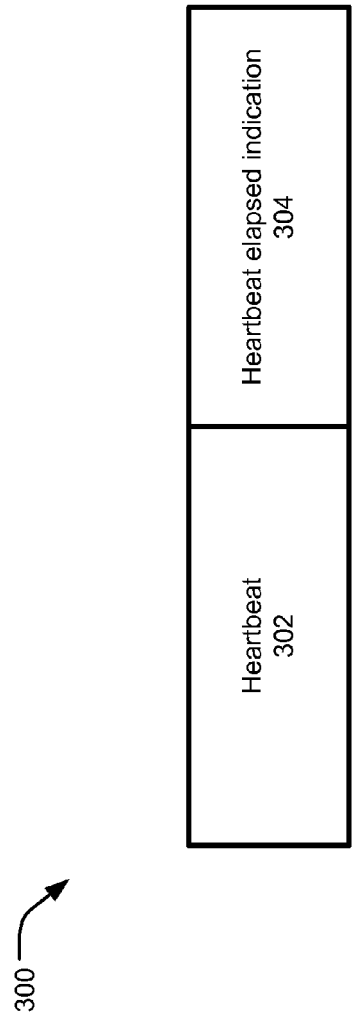
FIG. 3 illustrates an example message structure that may be used as a basis for maintaining wireless connection between stations (STAs).

FIG. 3 illustrates an exemplary format of a message 300 that provides information with regard to type of modulation to be used in sending the packet (e.g., a transmitter STA will send packets using the control PHY modulation 202). In an implementation, the STA 102-2, which acts as a transmitting STA, in wireless connection with the STA 102-4, which acts as a receiving STA, may follow conditions that may be defined in the message 300. In this implementation, the message 300 is received by the STA 102-2 from the STA 102-4 when the wireless connection is established between them. To this end, the STA 102-4 may anticipate receiving of the packets (not shown) that may utilize the control PHY modulation 202 or any types of modulations.

In an implementation, the message 300 may include a heartbeat 302 and a heartbeat elapsed indication 304. In this implementation such as when a value of the heartbeat 302 is not equal to one (1), the STA 102-2 at start of TxOP may utilize any modulations types (e.g., control PHY modulation 202, SC modulation 204 or OFDM modulation 206) in transmitting the packet (not shown). The TxOP may include an interval of time when a particular station such as the STA 102-2 in the above example has the right to initiate transmissions. The interval of time is defined by a starting time up to a maximum duration of time configured for the TxOP.

In an implementation, if the value of the heartbeat 302 is equal to one (1), then the STA 102-2 may check if the value for the heartbeat elapsed indication 304 is equal to zero (0). If the heartbeat elapsed indication 304 value is zero (0), then the STA 102-2 may transmit the packet such as the RTS or self-CTS by control PHY modulation 202. In this example, the utilization of the control PHY modulation 202 by the STA 102-2 in keeping the wireless connection may be anticipated by the STA 102-4 such that, the STA 102-4 may configure itself (e.g., enable its AGC feature) when receiving the packet (not shown) from the STA 102-2. Conversely, if the value of the heartbeat elapsed indication 304 is not equal to zero (0), then the STA 102-2 may be configured to check if elapsed time—that includes interval of time defined by end of maximum duration time for previous TxOP and the starting time for a current TxOP—is shorter than a heartbeat elapsed time 306. The heartbeat elapsed time 306 may be derived through the following equations:

Heartbeat Elapsed Time 306= $(2^{Heatbeat\ Elapsed\ Indication\ 304})*(0.25\ msec)$.

In an implementation, if the elapsed time is longer than the heartbeat elapsed time 306, then the STA 102-2 may transmit the RTS or self-CTS packets using the control PHY modulation 202. Otherwise, if the elapsed time is shorter than the computed heartbeat elapsed time 306, then the STA 102-2 may transmit the packet (not shown) using any type of modulations such as the control PHY modulation 202, SC modulation 204 or OFDM modulation 206.

Figure 4:
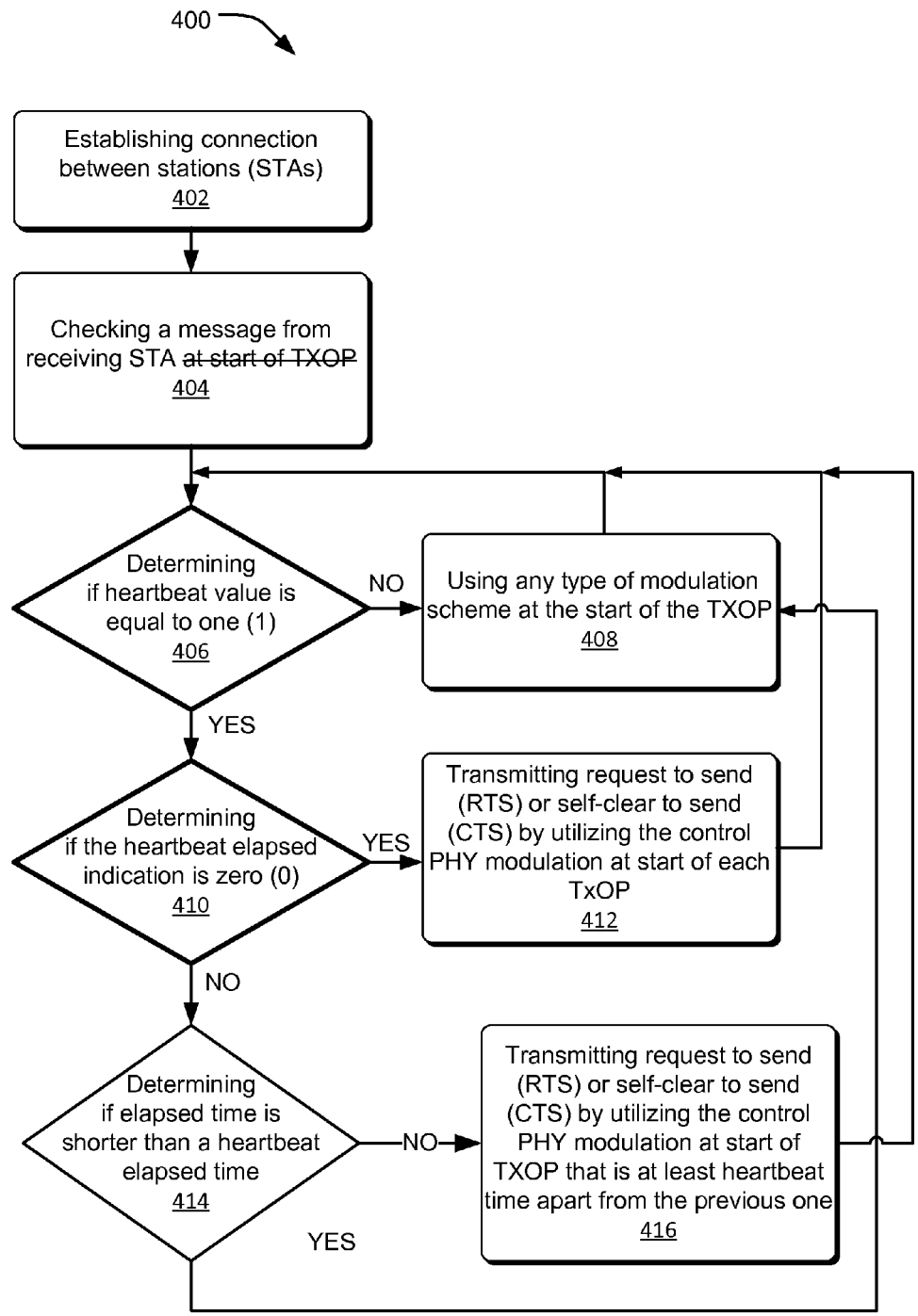
FIG. 4 illustrates an example method for maintaining wireless connection at a transmitting station (STA) end.

FIG. 4 shows an example process flowchart 400 illustrating an example method for maintaining wireless connection at a transmitting STA end. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, establishing wireless connection is performed. In an implementation, the wireless connection (e.g., wireless connection 104) may be established between a first STA (e.g., STA 102-2) and a second STA (e.g., STA 102-4) in a wireless communication environment that adapts WiGig specification or IEEE 802.11 ad standard.

At block 404, checking of a message to include checking of a heartbeat and heartbeat elapsed indication at start of TxOP is performed. In an implementation, The STA 102-2 may determine what type of modulation to use in transmitting a packet and maintain the wireless connection with the STA 102-4. In this implementation, the STA 102-2 may check the heartbeat (e.g., heartbeat 302) and the heartbeat elapsed indication (e.g., heartbeat elapsed indication 304) values at the start of the TxOP. The TxOP may include interval of time when the STA 102-2 device has the right to initiate transmissions and the interval of time is defined by a starting time up to a maximum duration of time configured for the TxOP.

At block 404 checking a message from a receiving STA 102-4 is performed to set up the heartbeat and heartbeat elapsed time at the STA 102-2

In an implementation, the message 300 may be received from the STA 102-4 that anticipates receiving of the packet through a control PHY modulation (e.g., control PHY modulation 202) or any other type of modulations such as SC modulation 204 or OFDM modulation 206. In this implementation, the STA 102-4 may be able to configure and adjust its AGC feature depending upon the type of modulation to be anticipated based on the message 300. For example, the AGC feature is enabled when receiving the control PHY modulated packet, and disabled when receiving SC modulated packet or OFDM modulated packet.

At block 406, determining if the heartbeat is equal to value of one (1) is performed. In an implementation, the STA 102-2 may check or determine if the heartbeat 302 value is equal to one. If NO, then at block 408, the STA 102-2 may use any type of modulation (e.g., control PHY modulation 202, SC modulation 204 or OFDM modulation 206) in transmitting the packet at the start of the TxOP. If block 406 is determined as YES, then at block 410, the heartbeat elapsed indication 304 is further checked if it includes a zero (0) value.

At block 410 (which follows the YES branch of 406), determining if the heartbeat elapsed indication 304 value is zero. If YES, then at block 412, the STA 102-2 may transmit packets such as RTS/self-CTS packets through the control PHY modulation 202 at the start of each TxOP. Otherwise, at block 414 (following the NO branch of block 410), an elapsed time is compared with a heartbeat elapsed time (e.g., heartbeat elapsed time 306). If the elapsed time is longer than the heartbeat elapsed time 306, then the STA 102-2 may perform the operation in block 412, and in particular, the transmitting of the RTS and/or self-CTS packet using the control PHY modulation 202. If the elapsed time is less than the heartbeat elapsed time 306, then at block 408, the STA 102-2 may deliver the packet using any type of modulations to the STA 102-4. In an implementation, the elapsed time and the heartbeat elapsed time 306 may be computed using the following formulas:

$$\text{Elapsed Time} = (\text{starting time for a next TxOP}_n) - (\text{end of maximum duration time for previous TxOP}_{n-1})$$

$$\text{Heartbeat Elapsed Time } 306 = (2^{\text{Heartbeat Elapsed Indication } 304}) * (0.25 \text{ msec})$$

where the $\text{TxOP}_n$ is for current transmission opportunity while $\text{TxOP}_{n-1}$ is for previous transmission opportunity; and the heartbeat elapsed indication 304 may include a value that is defined at the receiving STA end (e.g., STA 102-4) and communicated to the STA 102-2 through the message 300.

Different iterations are further illustrated by the logical arrows of process flow chart 400.

Figure 5:
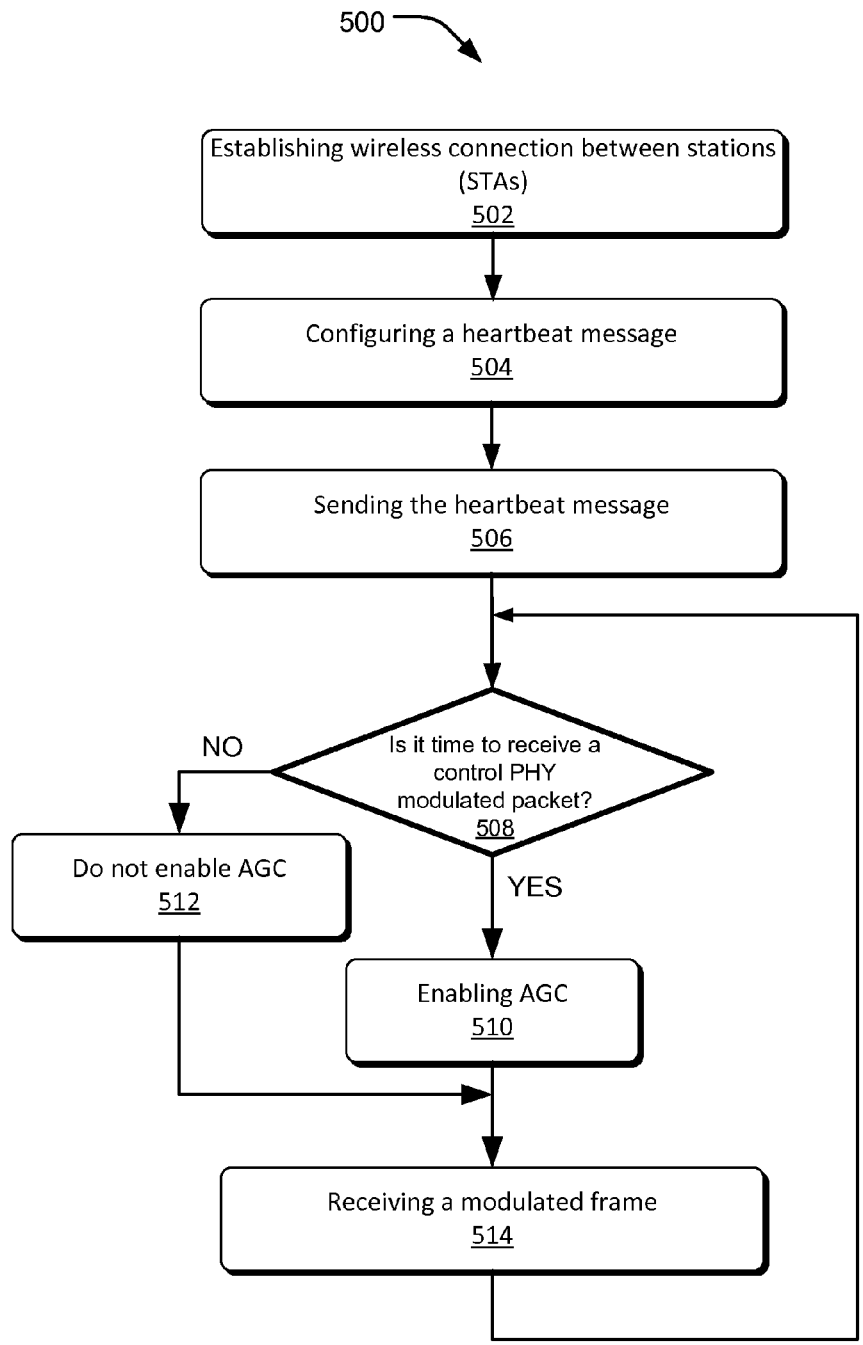
FIG. 5 illustrates an example method for maintaining wireless connection at a receiving station (STA) end.

FIG. 5 shows an example process flowchart 500 illustrating an example method for keeping wireless connection at a receiving end. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, establishing wireless connection is performed. For example, the connection may be established between a first STA e.g., STA 102-2 and another STA e.g., STA 102-4 in a wireless communications environment that implements the WiGig specification or IEEE 802.11ad standard.

At block 504, configuring a heartbeat message is performed. In an implementation, the STA 102-4 may configure the heartbeat message (e.g., message 300) that includes the heartbeat 302 and the heartbeat elapse indication 304 values. In this implementation, the message 300 may signify receiving of a control PHY modulated packet when keeping the wireless connection with the STA 102-2 or it may signify the use of any types of modulations such as the control PHY modulation 202, SC modulation 204 or OFDM modulation 206.

In an implementation, the STA 102-4 may be able to adjust its AGC feature by enabling or disabling the AGC feature depending upon the type of modulation that is signified or configured in the message 300.

At block 506, sending the heartbeat message 300 is performed. In an implementation, the receiving STA 102-4 may send the heartbeat message 300 to its peer such as the transmitting STA 102-2.

At block 508, determining if the control PHY modulation is used in the packet to be received is performed. In an implementation, the message 300 may determine if the control PHY modulation 202 may be used at first TxOP packet to be transmitted by the STA 102-2. If the control PHY modulation 202 is used, then at block 510, the STA 102-4 may enable its AGC feature. Otherwise, at block 512, the AGC feature for the STA 102-4 is disabled.

At block 514, receiving a modulated packet is performed. In an implementation, a control PHY modulated packet, a SC modulated packet, or OFDM modulated packet may be received by the STA 102-4 from the transmitting STA 102-2. In this implementation, the STA 102-4 may be able anticipate which type of modulation to receive and to correspondingly adjust the AGC feature to maintain linearity in its system even though the type of modulation to be received may change from the control PHY modulation 202 to other type of modulation.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

Figure 6:
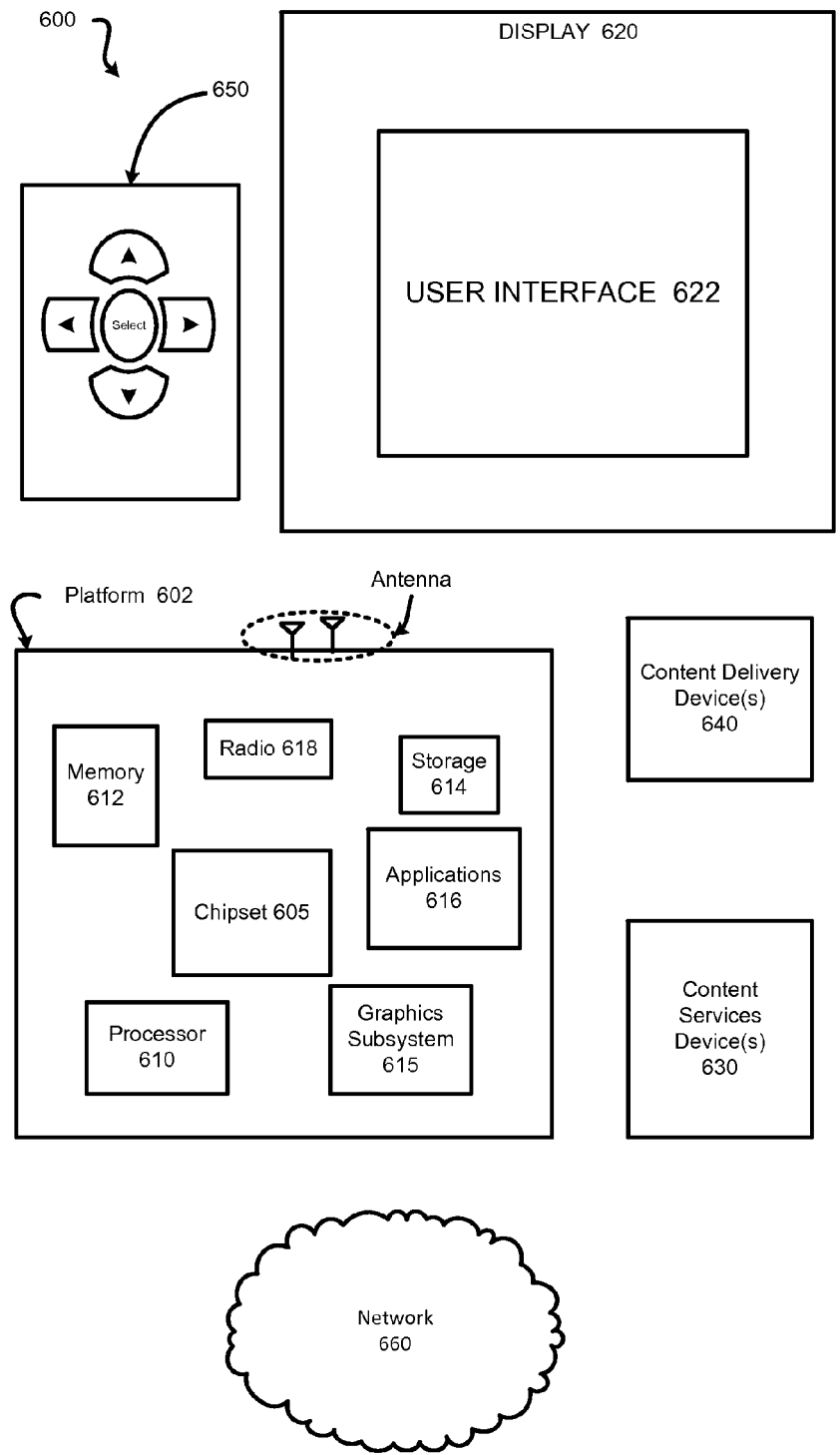
FIG. 6 illustrates an example station (STA) device to implement keeping of wireless connection between the STA device and another STA device.

FIG. 6 illustrates an example system 600 in accordance with the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

As described above, system 600 may be embodied in varying physical styles or form factors. FIG. 6 illustrates implementations of a small form factor device 600 in which system 600 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 7:
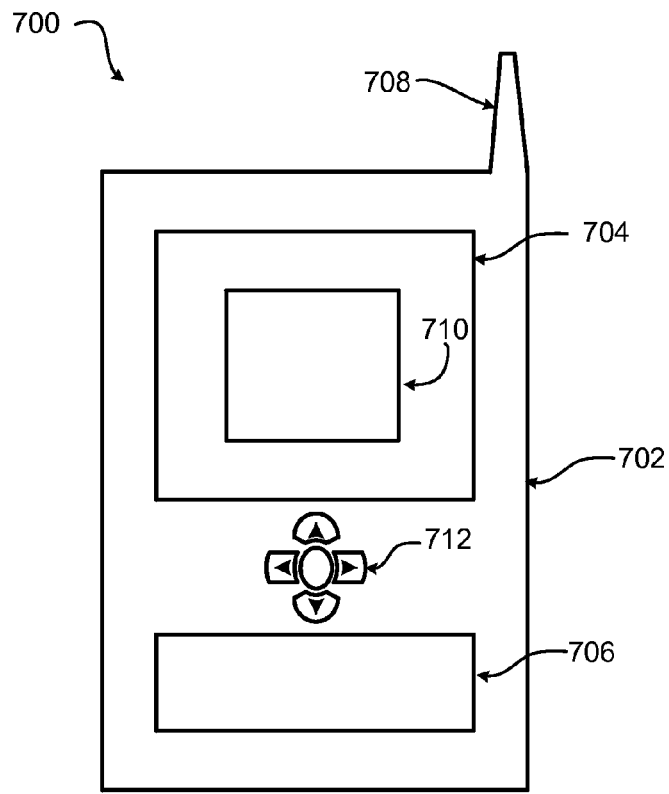
FIG. 7 illustrates an example station (STA) device.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A station (STA) device comprising:
a memory;
a processor configured to the memory to process a heartbeat message to maintain wireless connection between the STA and another STA, wherein the heartbeat message includes a heartbeat and a heartbeat elapsed indication values that are used to determine if a control physical layer (PHY) modulation, single carrier (SC) modulation, or orthogonal frequency division multiplexing (OFDM) modulation type is used to transmit a first packet of transmission opportunity (TxOP) wherein the control PHY modulation, SC modulation, or the OFDM modulation is used when an elapsed time is lesser than a heartbeat elapsed time, wherein the elapsed time and the heartbeat elapsed time are derived using following formulas:

$$\text{Elapsed Time} = (\text{starting time for a next TxOP}_n) - (\text{end of maximum duration time for previous TxOP}_{n-1})$$

$$\text{Heartbeat Elapsed Time} = (2^{Heartbeat\ Elapsed\ Indication}) * (0.25\ \text{msec})$$

wherein $\text{TxOP}_n$ is for current transmission opportunity while $\text{TxOP}_{n-1}$ is for previous transmission opportunity, and the heartbeat elapsed indication is defined at a receiving STA end and communicated to the STA.

2. The STA device of claim 1 wherein the processing includes checking if the heartbeat value is equal to one and the heartbeat elapsed indication value is equal to zero before transmitting a packet.

3. The STA device of claim 2 wherein transmitting the packet uses the control PHY modulation, and wherein the packet includes ready to send (RTS) or self-clear to send (CTS) packets.

4. The STA device of claim 1 wherein the control PHY modulation, SC modulation, or the OFDM modulation is used when the heartbeat value is not equal to one.

5. The STA device of claim 1 wherein the message is used to address a preamble length for the control PHY modulation that is substantially longer than preamble length in the single carrier (SC) modulation or the OFDM modulation.

6. A station (STA) device comprising:
a memory;
a processor configured to the memory to process a heartbeat message to maintain wireless connection between the STA and another STA, wherein the heartbeat message includes a heartbeat and a heartbeat elapsed indication values that are used to determine if a control physical layer (PHY) modulation, single carrier (SC) modulation, or orthogonal frequency division multiplexing (OFDM) modulation type is used to transmit a first packet of transmission opportunity (TxOP) wherein the control PHY modulation is used to transmit first frame in TxOP when an elapsed time is longer than a heartbeat elapsed time, wherein the elapsed time and the heartbeat elapsed time are derived using following formulas:

$$\text{Elapsed Time} = (\text{starting time for a next TxOP}_n) - (\text{end of maximum duration time for previous TxOP}_{n-1})$$

$$\text{Heartbeat Elapsed Time} = (2^{Heartbeat\ Elapsed\ Indication}) * (0.25\ \text{msec})$$

wherein $\text{TxOP}_n$ is for current transmission opportunity while $\text{TxOP}_{n-1}$ is for previous transmission opportunity.

7. A station (STA) device comprising:
a memory;
a processor connected to the memory to configure a message to signify receiving of a control PHY modulated packet when keeping wireless connection with another STA device, wherein the message is utilized to enable or disable an automatic gain control (AGC) feature of the STA device depending upon whether the control PHY modulation or another type of modulation is to be received based on the configured message, wherein the message is used to derive an elapsed time and a heartbeat elapsed time values that are utilized to determine type of modulation to be anticipated by the STA device, wherein the elapsed time and the heartbeat elapsed time are derived using following formulas:

Elapsed Time=(starting time for next TxOP$_n$)−(end of maximum duration time for previous TxOP$_{n-1}$)

Heartbeat Elapsed Time=($2^{Heartbeat\ Elapsed\ Indication}$)* (0.25 msec)

wherein TxOP$_n$ is current transmission opportunity while TxOP$_{n-1}$ is previous transmission opportunity for the other STA device.

8. The STA device of claim 7 wherein the other type of modulation includes a single carrier (SC) modulation or orthogonal frequency division multiplexing (OFDM) modulation.

9. The STA device of claim 7, wherein the message includes a heartbeat value equal to one and a heartbeat elapsed indication value equal to zero to signify receiving of the control PHY modulated packet.

10. The STA device of claim 7, wherein the message includes a heartbeat value that is not equal to one to signify receiving of the control PHY modulated packet, single carrier (SC) modulated packet or an orthogonal frequency division multiplexing (OFDM) modulated packet.

11. The STA device of claim 7 wherein the message is used to address a preamble length for the control PHY modulation that is substantially longer than preamble length in a single carrier (SC) modulation or orthogonal frequency division multiplexing (OFDM) modulation.

12. The STA device of claim 7, wherein the AGC feature is enabled when receiving the control PHY modulated packet, and disabled when receiving single carrier (SC) modulated packet or an orthogonal frequency division multiplexing (OFDM) modulated packet.

13. A method for keeping wireless connection by a transmitting station (STA) device comprising:
  checking a message to include a heartbeat and a heartbeat elapsed indication values when wireless connection is established between the STA device and another STA device;
  determining type of modulation to use in transmitting a packet for keeping the wireless connection based on the heartbeat and the heartbeat elapsed indication values, wherein a control PHY modulation is used when the heartbeat value is equal to one and the heartbeat elapsed indication value is equal to zero, wherein the control PHY modulation, a single carrier (SC) modulation or an orthogonal frequency division multiplexing (OFDM) modulation is used when the heartbeat value is not equal to one; and
  transmitting the control PHY, SC, or OFDM modulated packet wherein the control PHY modulation, SC modulation or the OFDM modulation is used when an elapsed time is lesser than a heartbeat elapsed time, wherein the elapsed time and the heartbeat elapsed time are derived using following formulas:

Elapsed Time=(starting time for a next TxOP$_n$)−(end of maximum duration time for previous TxOP$_{n-1}$)

Heartbeat Elapsed Time=($2^{Heartbeat\ Elapsed\ Indication}$)* (0.25 msec)

wherein TxOP$_n$ is for current transmission opportunity while TxOP$_{n-1}$ is for previous transmission opportunity, and the heartbeat elapsed indication is defined at a receiving STA device and communicated to the STA device.

14. A method for keeping wireless connection by a transmitting station (STA) device comprising:
  checking a message to include a heartbeat and a heartbeat elapsed indication values when wireless connection is established between the STA device and another STA device;
  determining type of modulation to use in transmitting a packet for keeping the wireless connection based on the heartbeat and the heartbeat elapsed indication values, wherein a control PHY modulation is used when the heartbeat value is equal to one and the heartbeat elapsed indication value is equal to zero, wherein the control PHY modulation, a single carrier (SC) modulation or an orthogonal frequency division multiplexing (OFDM) modulation is used when the heartbeat value is not equal to one; and
  transmitting the control PHY, SC, or OFDM modulated packet wherein the control PHY modulation is used when an elapsed time is longer than a heartbeat elapsed time, wherein the elapsed time and the heartbeat elapsed time are derived using following formulas:

Elapsed Time=(starting time for a next TxOP$_n$)−(end of maximum duration time for previous TxOP$_{n-1}$)

Heartbeat Elapsed Time=($2^{Heartbeat\ Elapsed\ Indication}$)* (0.25 msec)

wherein TxOP$_n$ is for current transmission opportunity while TxOP$_{n-1}$ is for previous transmission opportunity, wherein the control PHY modulation is used during duration of the TxOP$_n$.

15. The method of claim 14, wherein the message is used to address a preamble length for the control PHY modulation that is substantially longer than preamble length in the SC modulation or the OFDM modulation.

16. The method of claim 14 wherein the TxOP includes interval of time when the STA device has the right to initiate transmissions, wherein the interval of time is defined by a starting time up to a maximum duration of time configured for the TxOP.

17. The method of claim 14, wherein the message is utilized as basis for adjusting automatic gain control (AGC) to maintain linearity in another STA device.

18. The method of claim 14 further comprising establishing wireless connection between the STA device and the other STA device.

19. A method for keeping wireless connection by a receiving station (STA) device comprising:
  configuring a message to signify receiving of a control PHY modulated packet when keeping wireless connection with another STA device, wherein the message is utilized to enable or disable an automatic gain control (AGC) feature of the STA device depending upon whether the control PHY modulation or another type of modulation is to be received based on the configured message, and
  receiving the modulated packet wherein the message is used to derive an elapsed time and a heartbeat elapsed time, wherein the elapsed time and the heartbeat elapsed time are derived using following formulas:

Elapsed Time=(starting time for next TxOP$_n$)−(end of maximum duration time for previous TxOP$_{n-1}$)

Heartbeat Elapsed Time=($2^{Heartbeat\ Elapsed\ Indication}$)* (0.25 msec)

wherein TxOP$_n$ is current transmission opportunity while TxOP$_{n-1}$ is previous transmission opportunity for the other STA device.

20. The method of claim 19 wherein the other type of modulation includes a single carrier (SC) modulation or orthogonal frequency division multiplexing (OFDM) modulation.

21. The method of claim 19 wherein the message includes a heartbeat value equal to one and a heartbeat elapsed indication value equal to zero to signify receiving of the control PHY modulated packet.

22. The method of claim 19 wherein the message includes a heartbeat value that is not equal to one to signify receiving of the control PHY modulated packet, or a single carrier (SC) modulated packet or an orthogonal frequency division multiplexing (OFDM) modulated packet.

23. The method of claim 19, wherein the message is used to address a preamble length for the control PHY modulation that is substantially longer than preamble length in a single carrier (SC) modulation or orthogonal frequency division multiplexing (OFDM) modulation.

24. The method of claim 19 wherein the AGC feature is enabled when receiving the control PHY modulated packet, and disabled when receiving single carrier (SC) modulated packet or an orthogonal frequency division multiplexing (OFDM) modulated packet.

\* \* \* \* \*